US010028186B1

(12) United States Patent
Marupaduga

(10) Patent No.: US 10,028,186 B1
(45) Date of Patent: Jul. 17, 2018

(54) WIRELESS COMMUNICATION SYSTEM TO REDIRECT USE EQUIPMENT (UE) FROM A WIRELESS RELAY TO A DONOR BASE STATION

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/469,269

(22) Filed: Mar. 24, 2017

(51) Int. Cl.
*H04W 36/08* (2009.01)
*H04W 4/02* (2018.01)
*H04W 36/30* (2009.01)

(52) U.S. Cl.
CPC ........... *H04W 36/08* (2013.01); *H04W 4/025* (2013.01); *H04W 36/30* (2013.01)

(58) Field of Classification Search
None
See application file for complete search history.

(56) References Cited

U.S. PATENT DOCUMENTS

| 8,320,827 | B2 * | 11/2012 | Adjakple | H04B 7/155 455/7 |
| 8,953,444 | B2 | 2/2015 | Ghosh et al. | |
| 9,066,242 | B2 * | 6/2015 | Kazmi | H04W 16/26 |
| 2007/0086387 | A1 * | 4/2007 | Kang | H04B 7/2606 370/331 |
| 2009/0088161 | A1 * | 4/2009 | Narasimha | H04W 8/26 455/436 |
| 2009/0104911 | A1 * | 4/2009 | Watanabe | H04W 36/30 455/436 |
| 2010/0103863 | A1 | 4/2010 | Ulupinar et al. | |
| 2010/0322194 | A1 * | 12/2010 | Hu | H04W 36/023 370/331 |
| 2011/0002304 | A1 * | 1/2011 | Lee | H04W 36/02 370/331 |
| 2011/0080825 | A1 * | 4/2011 | Dimou | H04J 11/0086 370/216 |
| 2011/0080890 | A1 * | 4/2011 | Cai | H04W 36/0033 370/331 |

(Continued)

FOREIGN PATENT DOCUMENTS

CN 103004264 3/2013
WO 2016066286 5/2016

*Primary Examiner* — Steven H Nguyen

(57) ABSTRACT

A wireless communication network to redirect User Equipment (UE) to a donor base station, wherein the donor base station wirelessly serves a wireless relay and the UE, and the wireless relay wirelessly serves the UE. The wireless relay wirelessly exchanges user data with the UE using an established data bearer. The wireless relay detects that the data bearer is a Guaranteed Bit Rate (GBR) data bearer and in response, determines that the GBR data bearer is associated with a delay measurement that exceeds a delay measurement threshold. The wireless relay identifies a UE location and UE management data and determines that the donor base station is capable of serving the UE based on the UE location and the UE management data. The wireless relay wirelessly transfers an instruction to the UE redirecting the UE to exchange additional user data with the donor base station.

12 Claims, 7 Drawing Sheets

(56) References Cited

U.S. PATENT DOCUMENTS

| | | | |
|---|---|---|---|
| 2011/0235514 A1* | 9/2011 | Huang | H04B 7/15528 370/235 |
| 2012/0008776 A1* | 1/2012 | Ishida | H04W 12/04 380/247 |
| 2012/0028627 A1* | 2/2012 | Hunzinger | H04W 36/0083 455/422.1 |
| 2012/0039468 A1* | 2/2012 | Ishida | H04W 12/04 380/247 |
| 2012/0044859 A1* | 2/2012 | Hapsari | H04W 36/0016 370/315 |
| 2012/0113887 A1* | 5/2012 | Shen | H04W 36/0033 370/315 |
| 2012/0172045 A1* | 7/2012 | Fukuta | H04W 36/32 455/440 |
| 2012/0236782 A1 | 9/2012 | Bucknell et al. | |
| 2012/0252355 A1* | 10/2012 | Huang | H04W 36/0033 455/7 |
| 2012/0314690 A1* | 12/2012 | Xu | H04W 36/02 370/331 |
| 2013/0084884 A1* | 4/2013 | Teyeb | H04W 48/04 455/456.1 |
| 2013/0090055 A1* | 4/2013 | Pitakdumrongkija | H04B 7/15 455/9 |
| 2013/0183971 A1* | 7/2013 | Tamaki | H04W 36/0061 455/436 |
| 2013/0229939 A1* | 9/2013 | Teyeb | H04W 36/30 370/252 |
| 2013/0244659 A1* | 9/2013 | Murasawa | H04W 36/34 455/436 |
| 2014/0016542 A1* | 1/2014 | Ulupinar | H04B 7/2606 370/315 |
| 2014/0036873 A1* | 2/2014 | Cheng | H04W 36/0022 370/331 |
| 2014/0135015 A1 | 5/2014 | Liu et al. | |
| 2014/0192740 A1 | 7/2014 | Ekpenyong et al. | |
| 2014/0206354 A1* | 7/2014 | Yasuoka | H04B 7/15 455/436 |
| 2014/0211756 A1* | 7/2014 | Bontu | H04W 36/04 370/331 |
| 2014/0295865 A1 | 10/2014 | Fantaye et al. | |
| 2014/0369318 A1* | 12/2014 | Adjakple | H04B 7/155 370/331 |
| 2015/0181498 A1* | 6/2015 | Li | H04W 36/0094 455/437 |
| 2015/0195757 A1* | 7/2015 | Tietz | H04W 36/0061 455/438 |
| 2016/0044567 A1* | 2/2016 | Baghel | H04W 28/08 370/331 |
| 2016/0100340 A1* | 4/2016 | Kim | H04W 36/0083 370/332 |
| 2016/0345230 A1* | 11/2016 | Cuevas Ramirez | H04W 36/14 |
| 2017/0041842 A1* | 2/2017 | Yoon | H04W 36/02 |
| 2017/0230880 A1* | 8/2017 | Oroskar | H04W 36/22 |

* cited by examiner

WIRELESS COMMUNICATION SYSTEM TO REDIRECT USE EQUIPMENT (UE) FROM A WIRELESS RELAY TO A DONOR BASE STATION

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

Some wireless communication systems use Long Term Evolution (LTE) to exchange wireless data. LTE communication systems may be used to provide wireless signaling to the various wireless communication devices. Wireless access points, such as evolved NodeBs (eNodeBs), perform wireless networking tasks like device handovers, radio interference, management, and multipoint coordination. To facilitate these wireless networking tasks, the wireless access point communicates over signaling links with a UE.

To expand or enhance the wireless signal coverage of a wireless communication network, wireless communication relays are added to locations not adequately covered by current network infrastructure. A relay exchanges wireless signaling and data between UEs and another wireless access point. Without the signal repetition provided by the wireless relay, the coverage area of the wireless access point may otherwise have not extended far enough to serve the UEs using the relay. Thus, a wireless relay provides a less resource intensive means for increasing wireless network coverage. Wireless relays typically backhaul traffic through a communication link to a donor base station.

When implementing communication media sessions and other latency sensitive services, such as Voice over LTE (VoLTE) and video conferencing, quality of service should be at an optimum level. However, when communicating over multiple wireless access points, such as a macro base station and a wireless relay, latency for a media session may increase. However, a UE communicating with the wireless communication network over multiple wireless access points may have wireless access to a wireless access point closer to the wireless communication network, such as the macro base station serving the wireless relay. Unfortunately, existing techniques of redirecting a UE using latency sensitive services from a wireless relay to a macro base station are neither effective nor efficient.

TECHNICAL OVERVIEW

A wireless communication network to redirects User Equipment (UE) to a donor base station, wherein the donor base station wirelessly serves a wireless relay and the UE, and the wireless relay wirelessly serves the UE. The wireless relay wirelessly exchanges user data with the UE using an established data bearer. The wireless relay detects that the data bearer is a Guaranteed Bit Rate (GBR) data bearer and in response, determines that the GBR data bearer is associated with a delay measurement that exceeds a delay measurement threshold. The wireless relay identifies a UE location and UE management data and determines that the donor base station is capable of serving the UE based on the UE location and the UE management data. The wireless relay wirelessly transfers an instruction to the UE redirecting the UE to exchange additional user data with the donor base station.

DETAILED DESCRIPTION

Figure 1:
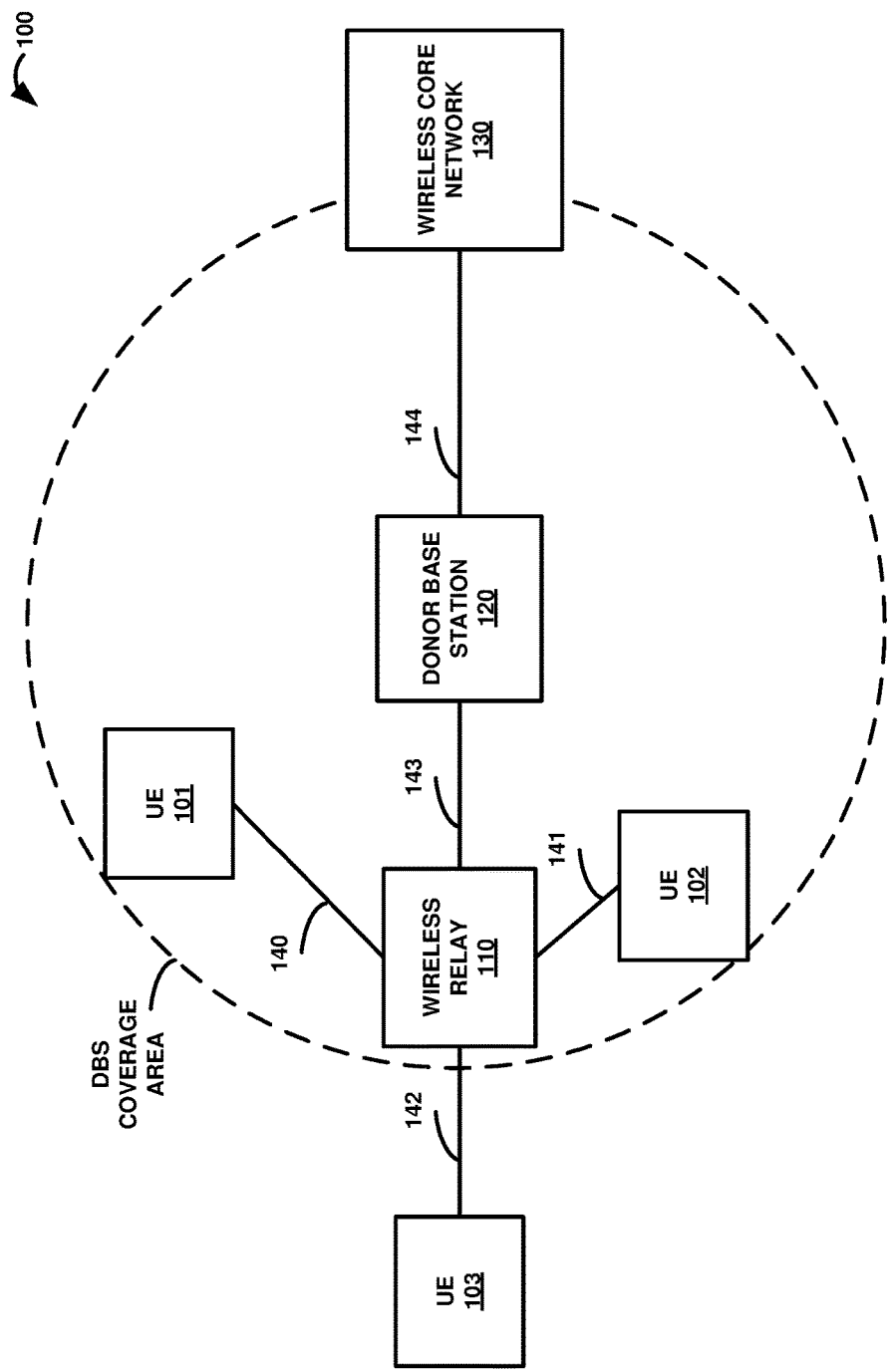
FIGS. 1-3 illustrate a wireless communication system to redirect User Equipment (UE) to a donor base station.
Figure 2:
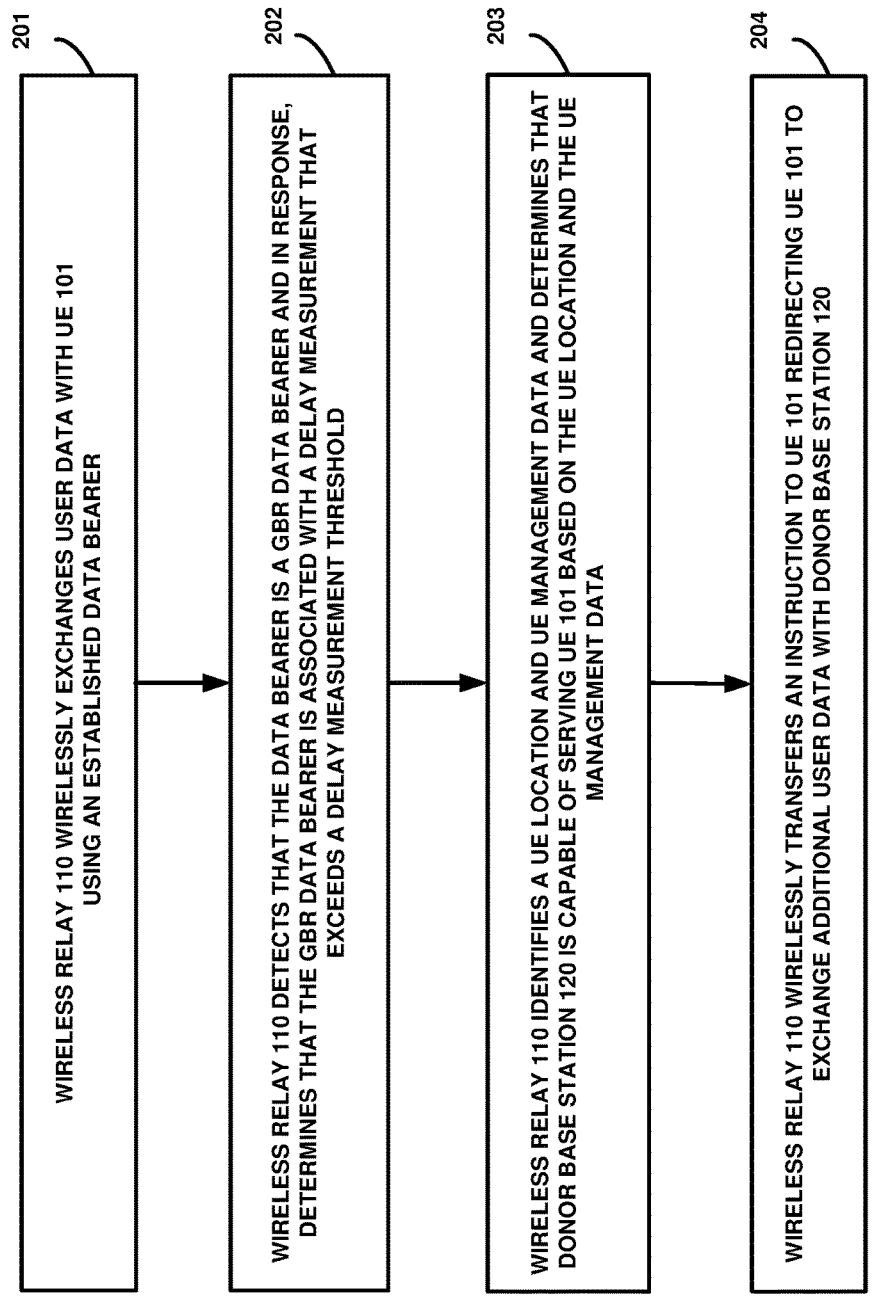
Figure 3:
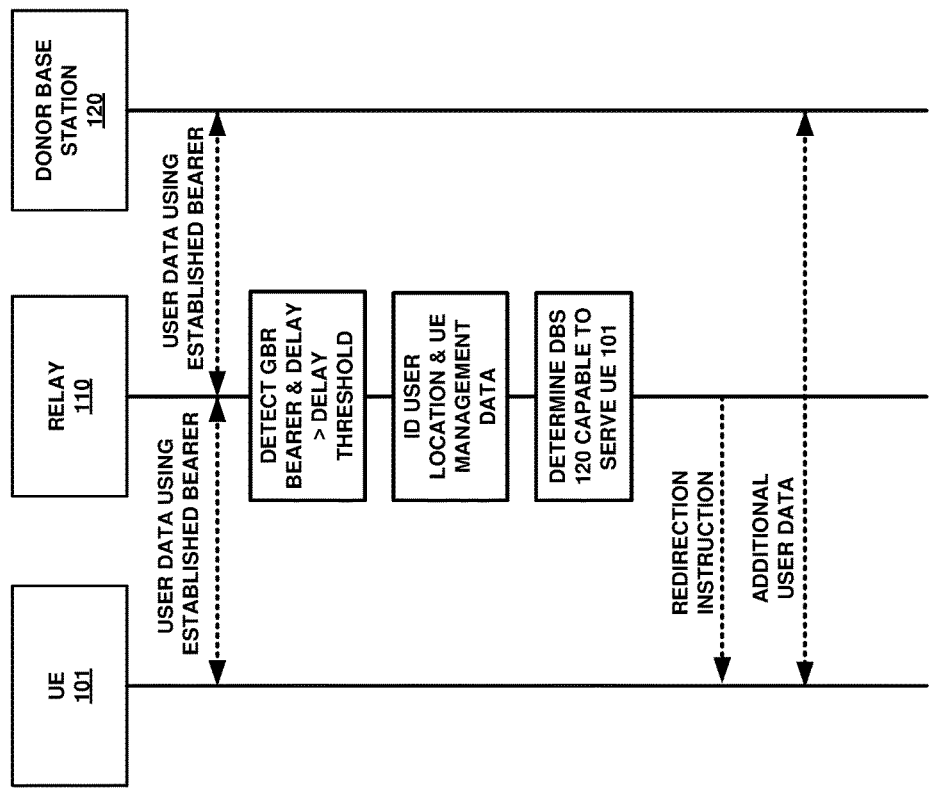

FIGS. 1-3 illustrate wireless communication system 100 to redirect User Equipment (UE) to a donor base station. Wireless communication system 100 transfers data between various UEs to provide data communication services, like internet access, media streaming, voice calls, user messaging, among other services. Referring to FIG. 1, wireless communication system 100 comprises UEs 101-103, wireless relay 110, donor base station 120, and wireless core network 130. As indicated by the dashed circle, wireless relay 110, UE 101, and UE 102 are in the wireless coverage area of donor base station 120.

UE 101 communicates with wireless relay 110 over wireless link 140. UE 102 communicates with wireless relay 110 over wireless link 141. UE 103 communicates with wireless relay 110 over wireless link 142. Wireless relay 110 communicates with donor base station 120 over wireless link 143. Donor base station 120 communicates with wireless core network 130 over communication link 144.

UEs 101-103 could be a phone, tablet computer, media device, intelligent machine, or some other apparatus having a wireless communication transceiver. UEs 101-103 include processing circuitry and communication transceivers, such as antennas, ports, bus interfaces, signal processors, memory that store and execute various software modules. UEs 101-103 are capable of attaching to and exchanging user data with wireless relay 110 and donor base station 120.

Wireless relay 110 may comprise an evolved NodeB (eNodeB), a mini-macro cell, a femtocell, a picocell, or some other wireless base station capable of providing wireless communication services to UEs. Donor base station 120 may comprise a macro base station, a wireless hotspot, an eNodeB, or some other base station that may provide wireless communication services to UEs 101-103 directly or over wireless relay 110.

Wireless relay 110 and donor base station 120 each include communication interfaces, microprocessors, storage systems, or some other processing systems or software systems, and may be distributed among multiple devices. Wireless relay 110 and donor base station 120 may be configured to provide wireless coverage to one or more UEs for voice calls, media streaming, internet access, text messages, and the like. Wireless relay 110 is capable of exchanging user data over an established data bearer. Wireless relay is also capable of detecting a bearer type and UE location.

Wireless core network 130 comprises computer equipment with software, such as packet gateways, network controllers, authorization databases, and the like. In some examples, wireless core network 130 comprises an Long Term Evolution (LTE) or System Architecture Evolution (SAE) core. The LTE/SAE core typically includes Serving Gateways (S-GWs), Mobility Management Entities (MMEs), Home Subscriber Systems (HSS), Packet Data Network Gateways (P-GWs), and Policy Charging Rules Functions (PCRFs).

Wireless links 140-143 may use air or space to transport media. Wireless links 140-144 may use protocols, such as LTE, Orthogonal Frequency Division Multiplexing (OFDM), Code Division Multiple Access (CDMA), LTE Wireless Aggregation (LWA), Internet Protocol (IP), Wireless Fidelity (WiFi), or some other wireless communication format-including combinations thereof.

Communication link 144 may use metal, glass, optics, air, space, or some other material as the transport media. Communication link 145 may use Time Division Multiplexing (TDM), IP, Ethernet, Synchronous Optical Networking (SONET), communication signaling, wireless communications, or some other communication format-including improvements thereof. Communication link 145 may be a direct link, or can include intermediate networks, systems, or devices, and can include a logical network link transported over multiple physical links.

In operation, wireless relay 110 exchanges user data with UE 101 using an established data bearer. User data may include attachment and registration information to establish signaling between UE 101 and wireless core network 130 over wireless relay 110 and donor base station 120. Wireless relay 110 may comprise a wireless relay UE (RE) and a wireless relay eNodeB. The RE in wireless relay 110 may exchange user data for UE 101 with donor base station 120 and the wireless relay eNodeB in wireless relay 110 may exchange user data with UE 101. The RE and relay eNodeB in wireless relay 110 may exchange data over an Ethernet link.

Wireless relay 110 detects that the data bearer is a Guaranteed Bit Rate (GBR) data bearer and in response, determines that the GBR data bearer is associated with a delay measurement that exceeds a delay measurement threshold. The established data bearer may comprise a Quality-of-Service (QoS) Class Identifier (QCI) to determine the QoS required for the bearer traffic type. Each QCI is associated with QoS parameters such as a GBR resource type, a non-GBR resource type, priority handling, packet delay budget, and packet error loss rate. A data bearer having a GBR resource type is guaranteed an amount of available bandwidth. A data bearer having a non-GBR resource type is a best effort type bearer and its bandwidth is not guaranteed.

The delay measurement may be a packet loss rate measurement, a latency measurement, a packet throughput measurement, or some other performance measurement to determine channel status and network congestion associated with the data bearer. The delay measurement threshold may be determined or stored by wireless relay 110. The delay measurement threshold may also be received from donor base station 120, UE 101, or some other networking element in wireless core network 130, such as an MME.

Wireless relay 110 identifies a UE location and UE management data and determines that donor base station 120 is capable of serving UE 101 based on the UE location and the UE management data. The location of UE 101 may be an identified Global Positioning System (GPS) coordinate, cell triangulation position, or some other mobile tracking technique location. The UE location may also be a determined distance from a radial coverage area of donor base station 120 based on measurement reports received from UE 101.

The UE management data may include a candidate donor base station list for UE 101. The candidate base station list may include base stations that are capable of serving UE 101 based on the UE location, data bearer type, donor base station traffic loading, or some other UE data indicating donor base stations capable of serving UE 101 directly. The UE management data may be received in the RE of wireless relay 110 over various communication interfaces, such as over an X2 interface link, an S1-MME interface link, or in a Non-Access Stratum (NAS) message.

Wire relay 110 wirelessly transfers an instruction to UE 101 redirecting UE 101 to exchange additional user data with donor base station 120. The instruction may be transferred from a wireless eNodeB in wireless relay 110 to the UE 101. The RE in wireless relay 110 may transfer the instruction to the eNodeB in wireless relay 110 over an Ethernet link. The eNodeB in wireless relay 110 may then transfer the instruction to redirect to donor base station 120 to UE 101. Advantageously, this allows optimal wireless access node usage for UE 101 having a delay sensitive GBR data bearer and is located within the coverage area of donor base station 120.

FIG. 2 is a flow diagram illustrating an operation of wireless communication system 100 to redirect a UE to a donor base station. Wireless relay 110 wirelessly exchanges (201) user data with UE 101 using an established data bearer. Wireless relay 110 detects (202) that the data bearer is a GBR data bearer and in response, determines (202) that the GBR data bearer is associated with a delay measurement that exceeds a delay measurement threshold. Wireless relay 110 identifies (203) a UE location and UE management data and determines (203) that donor base station 120 is capable of serving UE 101 based on the UE location and the UE management data. Wireless relay 110 wirelessly transfers (204) an instruction to UE 101 redirecting UE 101 to exchange additional user data with donor base station 120.

FIG. 3 is a sequence diagram illustrating the operation of wireless communication system 100 to redirect a UE to a donor base station. Wireless relay 110 wirelessly exchanges user data with UE 101 using an established data bearer. For example, UE 101 may attach to wireless core network 130 over wireless relay 110 and donor base station 120. UE 101 and donor base station 120 then exchange data and signaling over wireless relay 110. In this example, UE 101 may have established a default data bearer, such as a QCI 5 for Internet Protocol (IP) Multimedia Subsystem (IMS) signaling.

In some examples, wireless relay 110 comprises a wireless RE and a wireless relay eNodeB. In this example, the wireless relay eNodeB in wireless relay 110 exchanges the user data with UE 101 using the established data bearer, and the RE in wireless relay 110 exchanges the user data with donor base station 120 using the established data bearer. It should be noted that the wireless relay eNodeB and the RE in wireless relay 110 exchange the user data and control signaling over a communication link, such as an Ethernet link.

In a next operation, wireless relay 110 detects that the data bearer is a GBR data bearer and in response, determines that the GBR data bearer is associated with a delay measurement that exceeds a delay measurement threshold. For example, UE 101 may detect that UE 101 accepts a QCI 1 data bearer to exchange conversational voice data over wireless relay 110, donor base station 120, and wireless core network 130. In this example, the QCI 1 parameters include a GBR resource type, a packet delay budget of 100 milliseconds (ms), and a packet error loss rate of 10-2. Therefore, wireless relay 110 detects that the QCI 1 is a GBR data bearer with an associated delay measurement threshold of a packet delay budget of 100 ms and a packet error loss rate of 10-2.

Wireless relay 110 may determine delay measurements by determining a delay time for packets passing through the data bearer, an amount of packets that are lost of the total transmitted packets, retransmission rates, and the like. Wireless relay 110 may determine the delay measurement threshold associated with the data bearer by querying an internal database, or receiving delay measurement thresholds from UE 101, donor base station 120, or a network element within wireless core network 130.

For example, wireless relay 110 may query an MME within wireless core network 130 to determine the packet delay budget and packet error loss rate associated with the QCI 1 data bearer. Wireless relay 110 may then determine that the delay measurements exceed the delay measurement threshold by determining current GBR data bearer is experiencing a packet delay of 150 ms and a packet error loss rate of 10-3. Therefore, packet delay and packet error loss rate experienced by UE 101 exceeds the packet delay budget of 100 ms and packet error loss rate of 10-2.

In some examples, wireless relay 110 detects that the data bearer is a non-GBR and in response, exchanges additional user data with the UE. For example, UE 102 may be streaming internet data from wireless core network 130 using a QCI 9. Since the QCI 9 is a non-GBR data bearer, wireless relay 110 continues to exchange user data with UE 102 without redirecting UE 102 to donor base station 120.

In other examples, wireless relay 110 detects that the data bearer is a GBR and determines that the GBR data bearer is associated with a delay measurement that does not exceed the delay measurement threshold. In this example, although the data bearer is a GBR data bearer, since the delay measurement is equal to or below the delay measurement threshold, wireless relay 110 continues to exchange additional user data with the UE.

For example, UE 102 may be exchanging conversational video data using a QCI 2 data bearer. The QCI 2 is associated with a GBR resource type, a packet delay budget of 150 ms, and a packet error loss rate of 10-3. In this example, UE 102 is experiencing a packet delay of 150 ms and an error loss rate of 10-3. Since the current packet delay and the packet error loss rate do not exceed the packet delay budget and the packet error loss rate threshold, wireless relay 110 continues to exchange conversational video data with UE 102 without redirecting UE 102 to donor base station 120 even though UE 102 is using a GBR data bearer.

Wireless relay 110 identifies a UE location and UE management data and determines that donor base station 120 is capable of serving UE 101 based on the UE location and the UE management data. Wireless relay 110 may identify a UE location by determining GPS coordinates, cell triangulation, or some other location based service. Wireless relay 110 may also identify a UE location based on information received from UE 101, such as measurement reports indicating signal strength measurements, candidate donor base station lists, candidate wireless relay lists, and the like.

The UE management data may include a candidate list of capable donor base stations based on a UE location, data bearer type, donor base station traffic loading, and the like. In some examples, the UE management data may be maintained by an Element Management System (EMS) with access to a coverage analysis database. The UE management data may then be retrieved for later use by wireless relay 110 over various interface links and networking elements, such as donor base station 120 or an MME in wireless core network 130.

In some examples, wireless relay 110 identifies the UE management data by receiving the UE management data from donor base station 120 over an X2 interface link. In other examples, wireless relay 110 identifies the UE management data by receiving the UE management data from an MME in wireless core network 130 in a NAS message. In other examples, wireless relay 110 identifies the UE management data from an MME in wireless core network 130 over an S1-MME interface link. In each of the above examples, wireless relay 110 may receive the UE management data in an RE within wireless relay 110.

In a final operation, wireless relay 110 wirelessly transfers an instruction to UE 101 redirecting UE 101 to exchange additional user data with donor base station 120. Wireless relay 110 may wirelessly transfer the instruction to UE 101 by a wireless relay eNodeB in wireless relay 110. The instruction to redirect from the wireless relay 110 to donor base station 120 may be transferred to UE 101 in a Radio Resource Control (RRC) message. In response to the instruction, UE 101 then attaches directly to donor base station 120 for additional user data. Advantageously, UE 101 may communicate delay sensitive data over the GBR data bearer over fewer wireless access points which increases quality of service for the media session.

Figure 4:
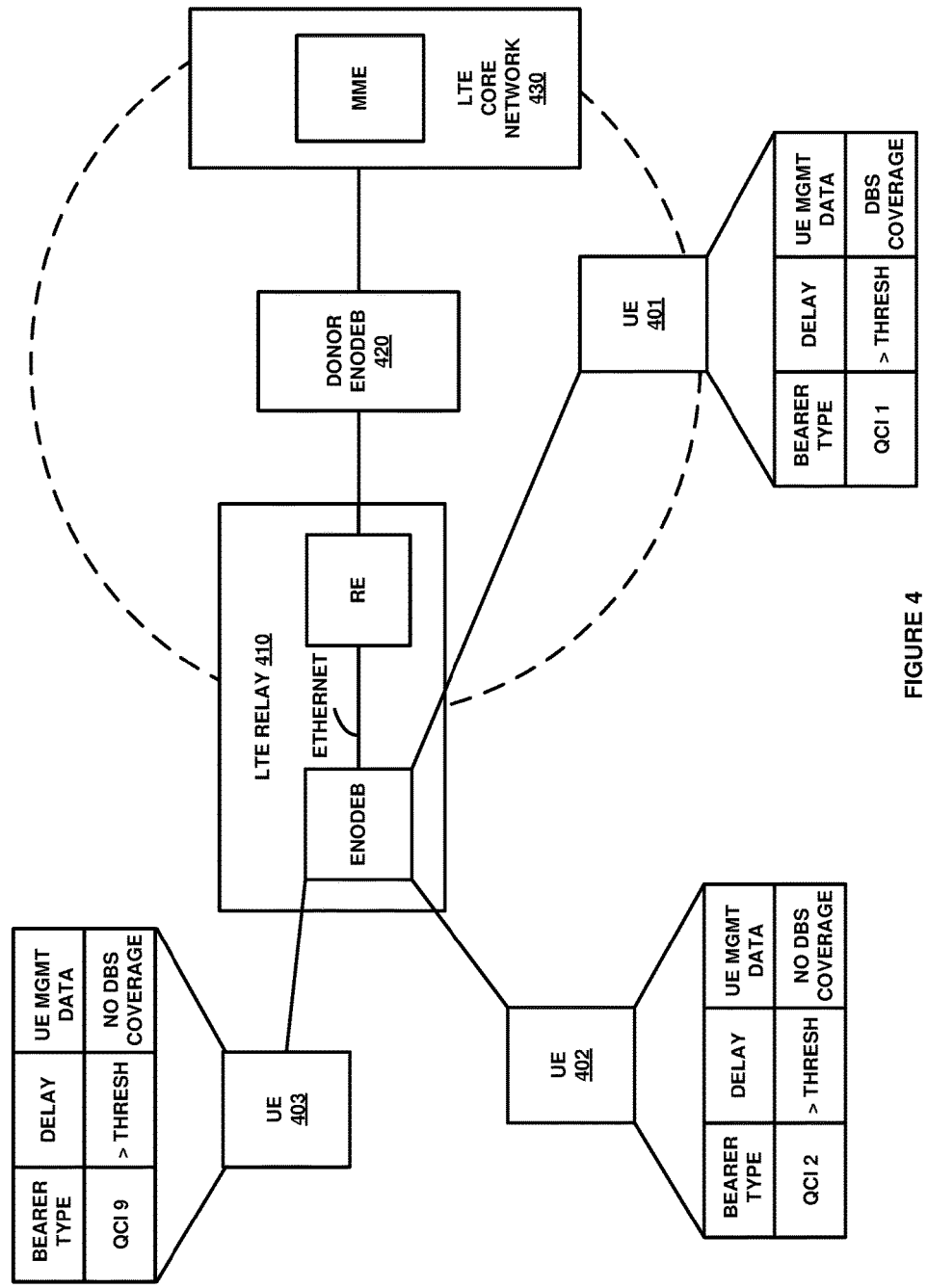
FIGS. 4-6 illustrate a Long Term Evolution (LTE) communication system to redirect a UE to a donor base station.

FIG. 4 illustrates Long Term Evolution (LTE) communication system 400 to control CA. LTE communication system 400 is an example of communication system 100, although communication system 100 may use alternative configurations and operations. LTE communication system 400 includes UEs 401-403, LTE wireless relay 410, donor eNodeB 420, and an LTE core network 430 including an MME.

UE 401 exchanges Voice over LTE (VoLTE) data with donor eNodeB 420 over LTE wireless relay 410 using a QCI 1 data bearer. UE 402 exchanges video data with donor eNodeB 420 over LTE wireless relay 410 using a QCI 2 data bearer. UE 403 streams internet data from donor eNodeB 420 over LTE wireless relay 410 using a QCI 9 data bearer. LTE wireless relay 410 communicates with donor eNodeB 420 using an X2 interface link (not shown). The MME in LTE core network 430 communicates with LTE wireless relay 410 using an S1-MME link (not shown).

LTE wireless relay 410 comprises a relay eNodeB, an Ethernet switch, and an RE. The RE includes processing circuitry and memory that store and execute various software modules. The RE also comprises communication transceivers, such as antennas, ports, bus interfaces, signal processors, memory, and software. The RE in LTE wireless relay 410 is capable of exchanging signaling and data with donor eNodeB 420.

The Ethernet switch is capable of communicating user data with external entities using communication links, such as a Data Over Cable Service Interface Specification (DOCSIS), Ethernet, WiFi, WDM, TDM, IP, and the like. The Ethernet switch also exchanges data between the relay eNodeB and the RE within LTE wireless relay 410. The relay eNodeB in LTE wireless relay 410 comprises communication transceivers, such as antennas, ports, bus interfaces, signal processors, memory, and software. The relay eNodeB is capable of exchanging signaling and data with UEs 401-403.

Figure 5:
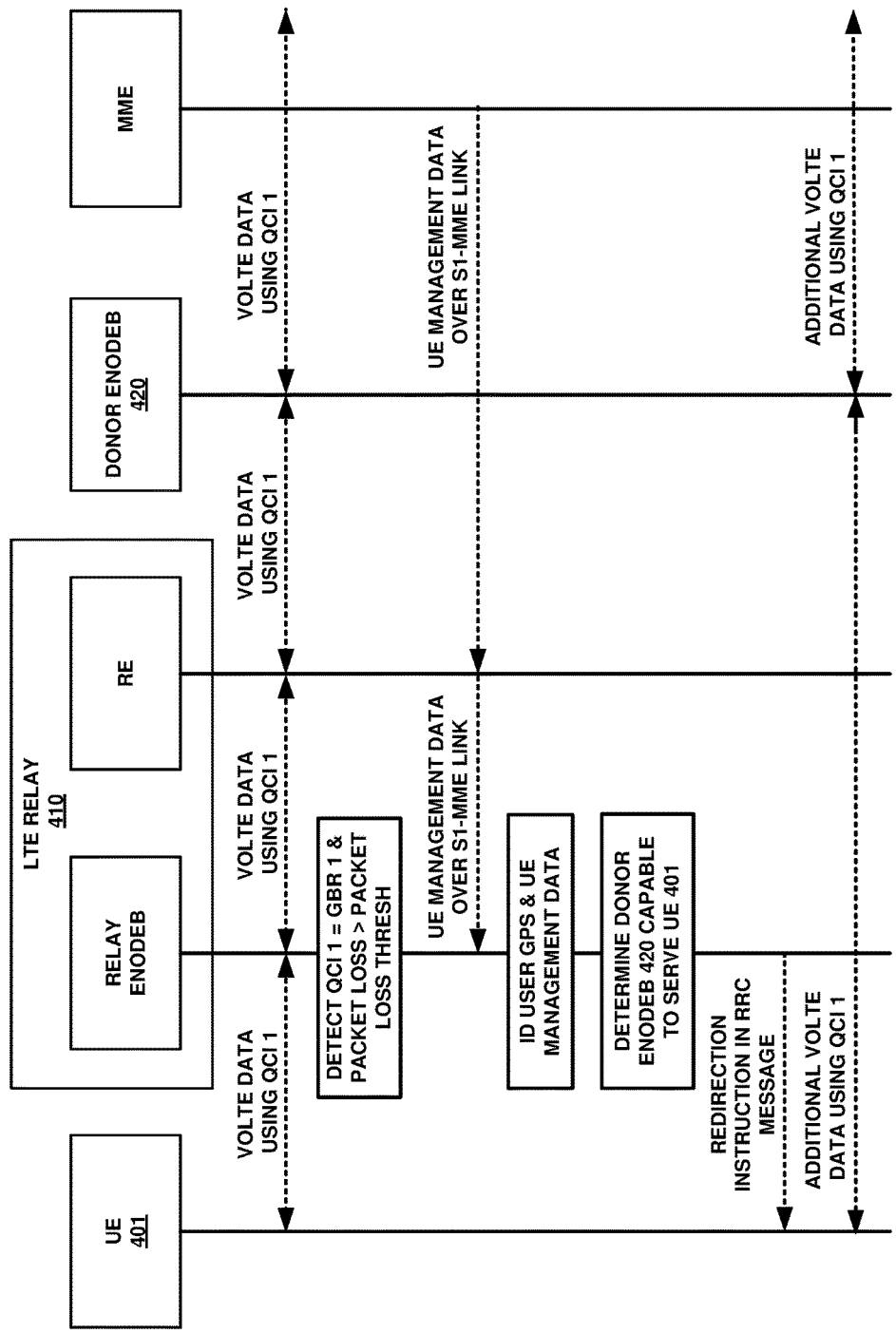

FIG. 5 illustrates a sequence diagram of LTE communication system 400 to redirect a UE to a donor base station. In operation, LTE wireless relay 410 wirelessly exchanges VoLTE data with UE 401 using a QCI 1 data bearer. LTE wireless relay 410 detects that the data bearer is a GBR data bearer and in response, determines that the GBR data bearer is associated with a packet error loss rate that exceeds a packet error loss rate threshold associated with the QCI 1.

LTE wireless relay 410 identifies the location of UE 401. LTE wireless relay 410 then receives UE management data from the MME in LTE core network 430 over an S1-MME interface link and determines that donor eNodeB 420 is capable of serving UE 401 directly based on the UE location and the UE management data. LTE wireless relay 410 wirelessly then transfers an instruction to UE 401 in an RRC message redirecting UE 401 to exchange additional VoLTE data with donor eNodeB 420 using the QCI 1 data bearer.

Figure 6:
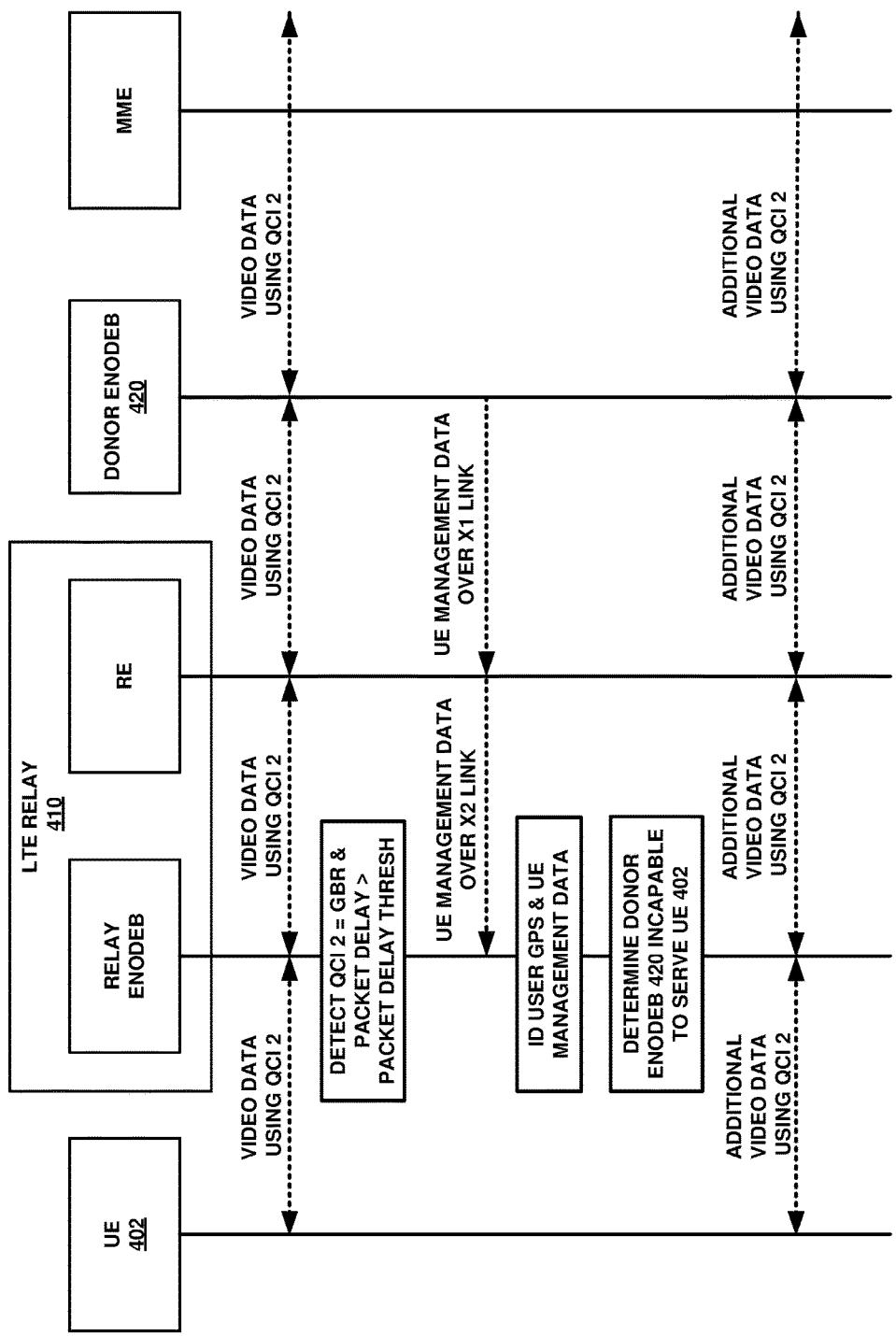

FIG. 6 illustrates an alternative sequence diagram of LTE communication system 400 to redirect a UE to a donor base station. In operation, LTE wireless relay 410 wirelessly exchanges conversational video data with UE 402 using a QCI 2 data bearer. LTE wireless relay 410 detects that the data bearer is a GBR data bearer and in response, determines that the GBR data bearer is associated with a packet delay that exceeds a budget packet delay associated with the QCI 2. LTE wireless relay 410 identifies the location of UE 402. LTE wireless relay 410 then receives UE management data from donor eNodeB 420 over an X2 interface link and determines that donor eNodeB 420 is not capable of serving UE 402 directly based on the UE location and the UE management data. LTE wireless relay 410 wirelessly then exchanges additional conversational video data between donor eNodeB 420 and UE 402 using the QCI 2 data bearer.

Figure 7:
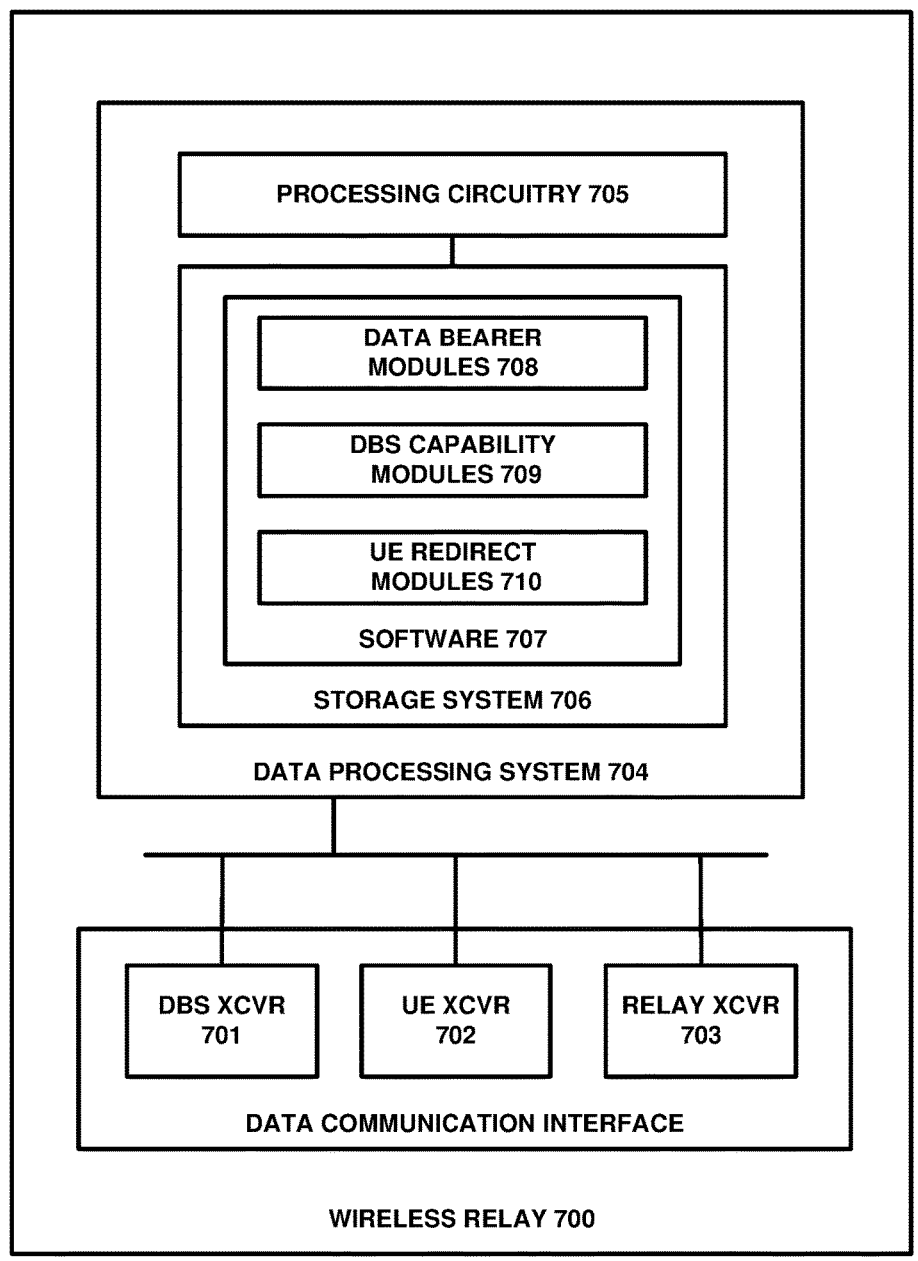
FIG. 7 illustrates a wireless relay to redirect a UE to a donor base station.

FIG. 7 illustrates wireless relay 700 to redirect a UE to a donor base station. Wireless relay 700 is an example of wireless relay 110 and LTE wireless relay 410, although wireless relay 110 and LTE wireless relay 410 may use alternative configurations and operations. Wireless relay 700 includes a data communication interface system comprising donor base station transceiver 701, UE transceiver 702, and relay transceiver 703. Wireless relay 700 also contains data processing system 704. Data processing system 704 is linked to donor base station transceiver 701, UE transceiver 702, and relay transceiver 703.

Donor base station transceiver 701, UE transceiver 702, and relay transceiver 703 comprise communication components, such as antennas, ports, amplifiers, filters, modulators, signal processors, and the like. Donor base station transceiver 701, UE transceiver 702, and relay transceiver 703 may be configured to use LTE, CDMA, OFDMA, LWA, IP, WiFi, or some other wireless communication format-including combinations thereof.

Donor base station transceiver 701 may be configured to wirelessly transfer user data to a donor base station serving the wireless relay chain. UE transceiver 702 may be configured to transfer user data to a UE using a data bearer. Relay transceiver 703 may be configured to exchange user data with additional wireless relays in a wireless relay chain.

Data processing system 704 includes processing circuitry 705 and storage system 706 that stores software 707. Processing circuitry 705 comprises a microprocessor and other circuitry that retrieves and executes software 707 from storage system 706. Storage system 706 comprises a non-transitory storage medium, such as a disk drive, flash drive, data storage circuitry, or some other memory apparatus. Software 707 comprises computer programs, firmware, or some other form of machine-readable processing instructions. Software 707 may further include an operating system, utilities, drivers, network interfaces, applications, or some other type of software. When executed by processing circuitry 705, software 707 directs processing system 704 to operate wireless relay 700 as described herein.

When executed by processing circuitry 705, data bearer modules 708 directs processing circuitry 705 to wirelessly exchange user data with a UE using an established data bearer. When executed by processing circuitry 705, data bearer modules 708 also directs processing circuitry 705 to detect that the data bearer is a GBR data bearer and that the GBR data bearer is associated with a delay measurement that exceeds a delay measurement threshold.

When executed by processing circuitry 705, donor base station capability modules 709 directs processing circuitry 705 to identify a UE location and UE management data. When executed by processing circuitry 705, donor base station capability modules 709 directs processing circuitry 705 to determine that the donor base station is capable of serving the UE based on the UE location and the UE management data. When executed by processing circuitry 705, UE redirect modules 710 directs processing circuitry 705 to wireless transfer an instruction to the UE redirecting the UE to exchange additional user data with the donor base station.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication network to redirect User Equipment (UE) that is served by a wireless relay and that is located at a UE location, the method comprising:
    the wireless relay wirelessly exchanging user data with the UE using a Guaranteed Bit Rate (GBR) data bearer;
    a Mobility Management Entity (MME) selecting donor base stations based on the UE location and transferring a list of the donor base stations and donor base station locations for delivery to the wireless relay;
    the wireless relay wirelessly receiving the list of donor base stations and the donor base station locations;
    the wireless relay detecting that the GBR data bearer has a delay measurement that exceeds a delay measurement threshold, and in response, the wireless relay selecting one of the donor base stations from the list of donor base stations based on the UE location and the donor base station locations; and
    the wireless relay wirelessly transferring an instruction to the UE redirecting the UE to exchange additional user data with the selected one of the donor base stations.

2. The method of claim 1 wherein the wireless relay comprises a Relay UE (RE) and a relay evolved NodeB (eNodeB).

3. The method of claim 1 wherein the wireless relay receiving the the list of the donor base stations and the donor base station locations from the MME comprises receiving a Non-Access Stratum (NAS) message.

4. The method of claim 1 wherein the wireless relay receiving the the list of the donor base stations and the donor base station locations from the MME over an S1-MME interface link.

5. The method of claim 1 wherein the GBR data bearer comprises a GBR Quality-of-Service (QoS) Class Identifier (QCI).

6. The method of claim 1 wherein the selected one of the donor base stations comprises a Long Term Evolution (LTE) evolved NodeB (eNodeB).

7. A wireless communication network to redirect User Equipment (UE) that is served by a wireless relay and that is located at a UE location, the wireless communication network comprising:

the wireless relay configured to wirelessly exchange user data with the UE using a Guaranteed Bit Rate (GBR) data bearer;

a Mobility Management Entity (MME) configured to select donor base stations based on the UE location and transfer a list of the donor base stations and donor base station locations for delivery to the wireless relay;

the wireless relay wirelessly configured to receive the list of the donor base stations and the donor base station locations;

the wireless relay configured to detect that the GBR data bearer has a delay measurement that exceeds a delay measurement threshold;

the wireless relay configured to select one of the donor base stations based on the UE location and the donor base station locations; and the wireless relay configured to wirelessly transfer an instruction to the UE redirecting the UE to exchange additional user data with the selected one of the donor base stations.

8. The wireless communication network of claim 7 wherein:

the wireless relay comprises a Relay UE (RE) and a relay evolved NodeB (eNodeB).

9. The wireless communication network of claim 7 wherein the wireless relay is configured to receive the list of the donor base stations and the donor base station locations from the MME in a Non-Access Stratum (NAS) message.

10. The wireless communication network of claim 7 wherein the wireless relay is configured to receive the the list of the donor base stations and the donor base station locations from the MME over an S1-MME interface link.

11. The wireless communication network of claim 7 wherein the GBR data bearer comprises a GBR Quality-of-Service (QoS) Class Identifier (QCI).

12. The wireless communication network of claim 7 wherein the selected one of the donor base stations comprises a Long Term Evolution (LTE) evolved NodeB (eNodeB).

* * * * *